US007819379B2

(12) United States Patent
Bolbolan

(10) Patent No.: US 7,819,379 B2
(45) Date of Patent: Oct. 26, 2010

(54) ATTACHMENT OF AN ARMATURE TO A VALVE NEEDLE IN A FUEL INJECTOR CONTROL VALVE

(75) Inventor: Daren Bolbolan, Shelbyville, MI (US)

(73) Assignee: Robert Bosch GmbH, Stuttgart (DE)

( * ) Notice: Subject to any disclaimer, the term of this patent is extended or adjusted under 35 U.S.C. 154(b) by 895 days.

(21) Appl. No.: 11/813,822

(22) PCT Filed: Feb. 8, 2005

(86) PCT No.: PCT/US2005/003941

§ 371 (c)(1), (2), (4) Date: Jul. 12, 2007

(87) PCT Pub. No.: WO2006/085872

PCT Pub. Date: Aug. 17, 2006

(65) Prior Publication Data

US 2008/0116405 A1 May 22, 2008

(51) Int. Cl.
*F16K 31/02* (2006.01)

(52) U.S. Cl. ...................... 251/129.16; 29/890; 29/520

(58) Field of Classification Search ............ 251/129.15, 251/129.16; 29/890, 13, 517, 520
See application file for complete search history.

(56) References Cited

U.S. PATENT DOCUMENTS

| | | | | |
|---|---|---|---|---|
| 4,621,660 | A * | 11/1986 | Klocke | 137/625.44 |
| 4,805,280 | A * | 2/1989 | Elander et al. | 29/898.07 |
| 5,333,836 | A | 8/1994 | Fukuyo et al. | |
| 5,815,920 | A * | 10/1998 | Earhart | 29/890.13 |
| 5,937,520 | A | 8/1999 | Earhart et al. | |
| 6,364,282 | B1 | 4/2002 | Ausman et al. | |
| 6,820,858 | B2 * | 11/2004 | Haeberer et al. | 251/129.16 |
| 7,080,819 | B2 * | 7/2006 | Tojo | 251/129.16 |

FOREIGN PATENT DOCUMENTS

EP 0 588 475 A2 3/1994

* cited by examiner

*Primary Examiner*—John K Fristoe, Jr.
(74) *Attorney, Agent, or Firm*—McGarry Bair PC

(57) ABSTRACT

The armature (16) of a solenoid operated fuel injector control valve (10) is attached to the valve needle (14) by a swaging process where the valve body (12) functions as the guide and the anvil for the swaging press.

12 Claims, 5 Drawing Sheets

ATTACHMENT OF AN ARMATURE TO A VALVE NEEDLE IN A FUEL INJECTOR CONTROL VALVE

CROSS-REFERENCE TO RELATED APPLICATIONS

This application claims priority on International Application No. PCT/US2005/003941, filed Feb. 8, 2005, which is incorporated herein in its entirety.

BACKGROUND OF THE INVENTION

1. Field of the Invention

The invention relates to fuel injectors and more particularly to the assembly of parts of a solenoid-operated control valve in a fuel injector.

2. Description of the Related Art

In a typical fuel injection system, a control valve is disposed between the high pressure side of a fuel passage connected to a pump or compressor, and the low pressure side connected to a reservoir. When the control valve is open, fuel flow from the pump bypasses the injector, "spilling" to the low-pressure reservoir. Fuel injection events are triggered when the control valve is closed, which normally occurs electronically by energizing a solenoid to move an armature mounted to a valve needle.

In a common control valve configuration, the armature is a flat metal plate and the valve needle is a spool or pin. The armature is mounted to the end of the valve needle and moves in a magnetic field generated when the solenoid is energized, thereby closing the control valve.

It is known to mount the armature to the valve needle by bolting as shown, for example, in EP 0 588 475. It is also known to swage the armature to the valve needle as disclosed, for example, in commonly owned U.S. Pat. No. 5,937,520. In the '520 patent, the swaging occurs in another operation separate from assembly, and with time consuming, costly secondary machining and grinding operations.

In some fuel injection systems, particularly common rail systems used in some automobiles, there is not enough space to permit assembling the armature to the valve needle before installing the valve needle in the valve body. Moreover, tight tolerances and small spaces do not permit assembly of the armature to the valve needle by bolting or any other known conventional means. There remains a need to provide assembly of the armature to the valve needle in a manner that will enable a large retention force (retaining the armature on the pin in the face of high acceleration and high fuel pressure), yet permit precise interferences in a small space.

SUMMARY OF THE INVENTION

These and other problems are solved by the present invention of a method of attaching an armature to a valve needle in a control valve of the type that can be used in a fuel injector. The method comprises providing a valve body having a bore, a planar face, and an annular chamfer in the planar face around the bore. A valve needle is inserted into the bore. The valve needle has a shank, a stem, and an annulus between the shank and the stem. An armature is placed over the stem. The armature has an annular flat facing the planar face and an annular shoulder extending from the annular flat. The final step comprises pressing the armature toward the valve body while the annular shoulder bears against the chamfer and deforms into the annulus until the annular flat is stopped by the planar face.

Preferably, the valve body and valve needle are formed of hardened steel and the armature is formed of softer metal. The softer metal can be a magnetic iron cobalt alloy. In one aspect, the annulus can be square shaped. In another aspect, the armature can be disk shaped, having a planar surface opposite the annular flat. In this case, the armature has a central bore that receives the stem in slip fit.

Preferably, the angle of the annular chamfer relative to the longitudinal axis of the bore is approximately 45 degrees, but the angle can be in a range of 15-60 degrees. In another aspect, the difference between the angle of the annular shoulder relative to the longitudinal axis at the point where it contacts the annular chamfer and the angle of the annular chamfer relative to the longitudinal axis is in a range of 15-20 degrees.

The annular shoulder can be provided with a relief chamfer. Also, the annular chamfer can be split with a shallower portion and a steeper portion. It will be understood that the invention contemplates any control valve made according the aforementioned methods.

DETAILED DESCRIPTION

Figure 1:
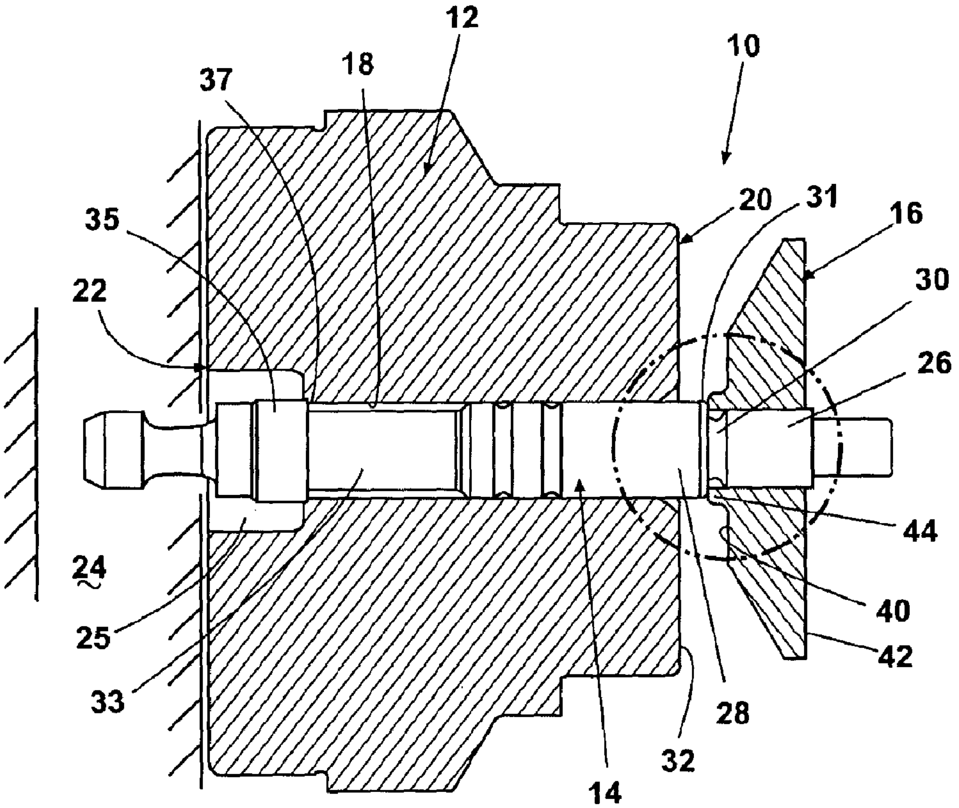
FIG. 1 is a side view, partly in cross section, of a first embodiment of an armature and control valve in a first stage of assembly.

A first embodiment of the invention is illustrated in FIGS. 1-4. Looking first at FIG. 1, the invention lies in the construction and assembly of a control valve 10 comprising a valve body 12, a valve needle 14, and an armature 16. It will be appreciated that the control valve 10 is the type that would be utilized in a fuel injector (not shown) connected, for example, to a common rail (not shown). A solenoid (also not shown) would be positioned to the right in FIG. 1.

The valve needle 14 is received in a bore 18 in the valve body 12 and sized to move freely therein, yet within very close tolerances. The valve body 12 has a proximal side 20 that faces the solenoid and a distal side 22 that faces a low-pressure fuel passageway 24. A stepped recess 25 in the bore 18 enables fluid communication between the low-pressure fuel passageway 24 and a high pressure side of the fuel system.

Figure 3:
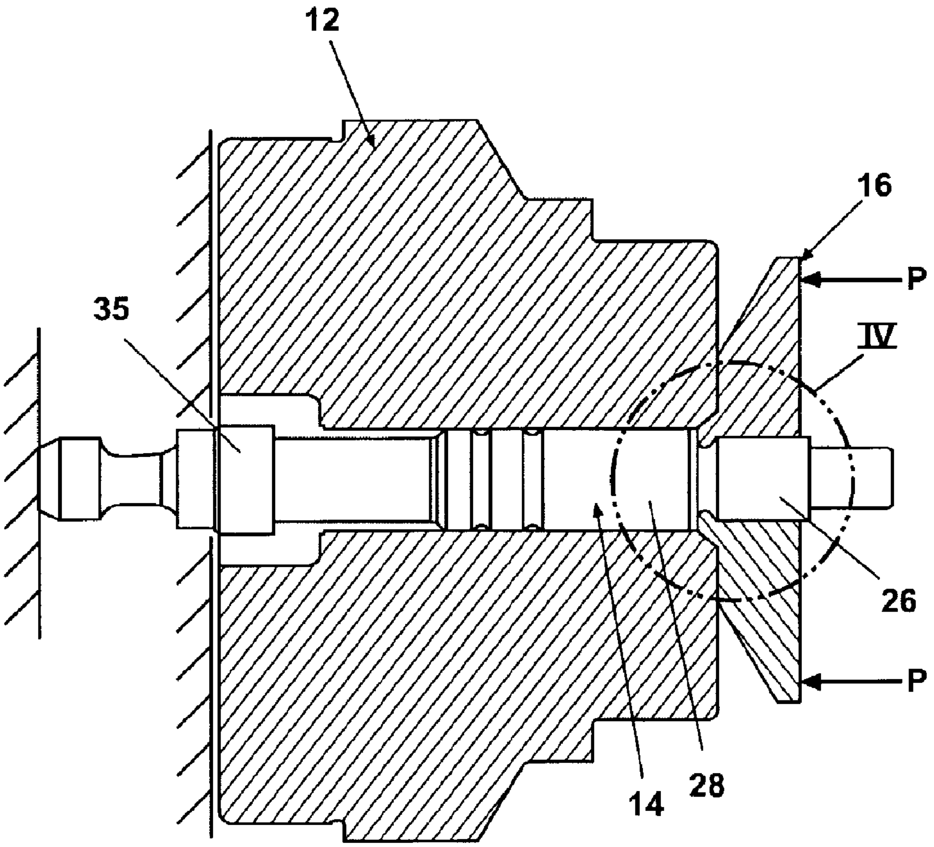
FIG. 3 is a side view, partly in cross section, of the armature and control valve of FIG. 1 in a second stage of assembly.
Figure 4:
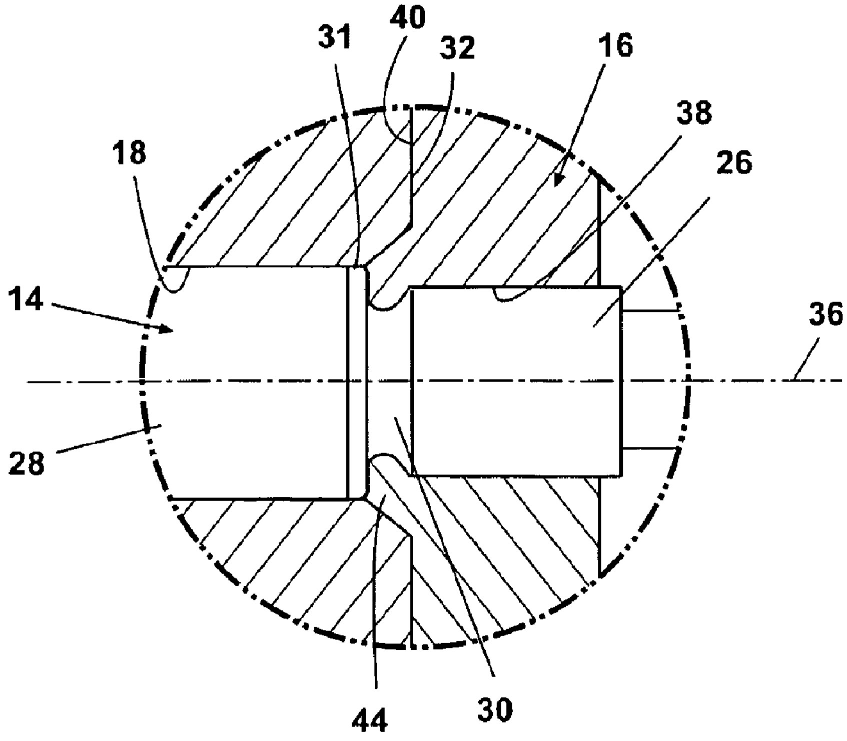
FIG. 4 is an enlarged view of the area bounded by IV in FIG. 3.

The valve needle 14 comprises a stem 26 extending from a shank 28 at the proximal side 20 of the valve body 12. An annulus 30 is located between the stem 26 and the shank 28. Preferably, the diameter of the shank 28 will be greater than the diameter of the stem 26 to form a shoulder 29 adjacent the annulus 30. A relief radius 31 is provided at the shoulder 29. The shank 28 extends to a reduced diameter portion 33 which is connected to a valve shoulder 35, adapted to sit within a valve seat 37 at the stepped recess 25. It will be appreciated that the configuration of the components is such that the control valve 10 must be assembled by positioning the valve needle 14 within the bore 18 before the armature 16 is secured to the valve needle 14. It must be inserted into the bore 18 from the distal side 22 toward the proximal side 20. In FIG. 1, the valve needle 14 is positioned as it would be to close the valve, inhibiting fluid communication between the low-pressure fuel passageway 24 and the high pressure side of the fuel system. In FIG. 3, the valve needle 14 is positioned as it would be to open the valve, normally biased to the open position.

The valve body 12 may have a thickness on the order of 18 mm and the diameter of the shank 28 may be on the order of 2.5 mm. Preferably the valve needle 14 is formed of hardened tool steel, such as, for example, DMO5 or SAE M2, and will be fully machined and ground to specification before assembly.

Figure 2:
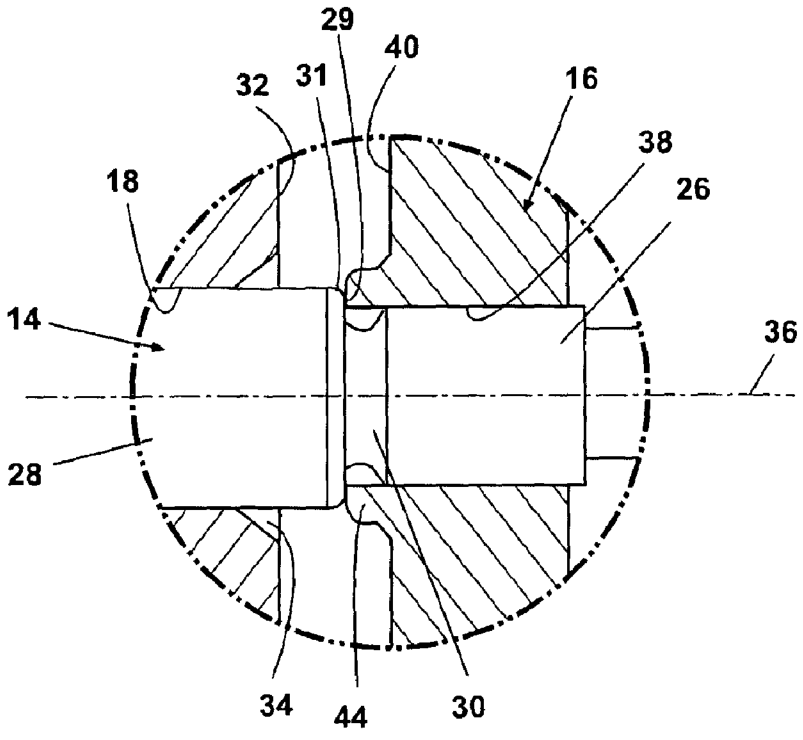
FIG. 2 is an enlarged view of the area bounded by II in FIG. 1.

Looking now also at FIG. 2, the valve body 12 has a planar face 32 at its proximal side 20. An annular chamfer 34 is disposed in the planar face 32 surrounding the bore 18. The angle of the chamfer 34 relative to the longitudinal axis 36 of the bore 18 is preferably 45° although it can have a range of angles from 15° to 60°. Preferably, the valve body 12 will also be formed of hardened steel, such as, for example, 100CR6 or SAE52/100, and will be fully machined and ground to specification before assembly.

The armature 16 is a generally disc shaped body with a central bore 38 sized to receive the stem 26 of the valve needle 14 in slip fit. The body has an annular flat 40 on the side facing the planar face 32 on the valve body 12, and a larger planar surface 42 on the other side facing the solenoid. An annular shoulder 44 extends from the flat 40. The armature 16 is made of a softer metal than either the valve body 12 or the valve needle 14, preferably a magnetic iron cobalt alloy such as Böhler P800. Like the valve body 12 and a valve needle 14, it will be fully machined and ground to specification before assembly.

To complete the process of securing the armature 16 to the valve needle 14, the finished valve needle 14 is inserted into the bore 18 of the finished valve body 12 with the stem 26 fully projecting from the proximal side 20. The armature 16 is disposed over the valve needle 14 with the stem 26 extending through the central bore 38 and the annular shoulder 44 bearing against the shoulder 29 of the shank 28. It will be apparent that the annular shoulder 44 surrounds the annulus 30. Pressure is applied to the planar surface 42 to urge the armature 16 and the valve needle 14 inwardly of the valve body 12. The annular shoulder 44 will eventually contact the chamfer 34. Continued pressure on the planar surface 42 causes the material in the annular shoulder 44 to flow and to be mechanically forced into the annulus 30. This swaging process continues until the annular flat 40 stops and abuts the planar face 32 of the valve body 12. The armature material swaged into the annulus 30 effectively secures the armature 16 to the valve needle 14. The relief radius 31 is believed to prevent binding at the stop point.

It will be apparent that the finished valve body 12 acts as a guide and anvil for the swaging process, with the chamfer 34 functioning as the swage tool. Moreover, when the annular flat 40 is stopped at the planar face 32, the armature 16 is effectively coined at the position to set a uniform surface height between the planar face 32 and the annular flat 40. Once the swaging process is complete, the valve needle 14 and the armature 16 are free to move together in reciprocating motion relative to the valve body 12.

It has been found that some dimensions in the geometry of the components are important to optimize the swaging process. For example, the size of the annulus 30 and the size of the annular shoulder 44 are preferably set to avoid overfill of armature material in the annulus. In addition, the angle of the chamfer 34 and the angle of the tangent of the annular shoulder 44 at the point of contact with the chamfer should preferably differ by approximately 15°, or at least within a range of 15°-20°. Further, the distance between the planar face 32 and the annular flat 40 at the point of contact defines the press length of the swaging operation. The dimensions of the annular shoulder 44 determine the required press length as well as the needed press force. The amount of material to be deformed and the size of the annulus 30 will affect the dimensions of the annular shoulder 44. To retain the finished armature 16 at higher forces will generally require more deformation and/or more material. The pressure required on the planar surface 42 to complete the swaging operation can be much greater than 1200 Newtons.

Figure 5:
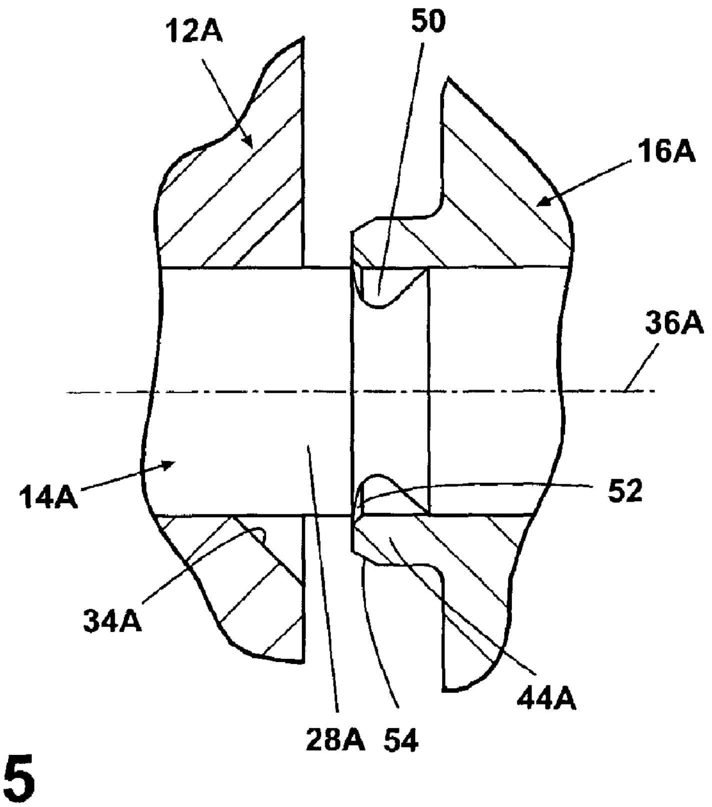
FIG. 5 is a partial cross sectional view similar to FIG. 2 of a second embodiment of an armature and control valve in a first stage of assembly.
Figure 6:
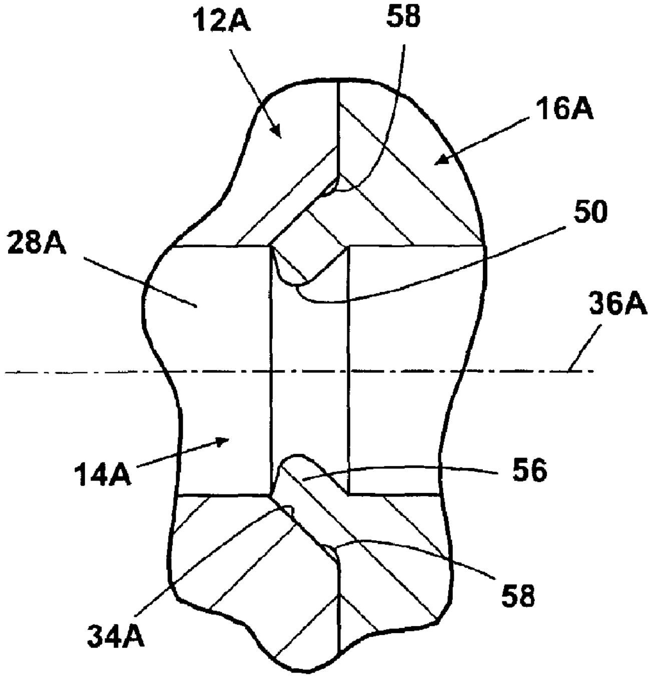
FIG. 6 is a partial cross sectional view of the second embodiment of FIG. 5 in a second stage of assembly.

FIGS. 5 and 6 illustrate a second embodiment where the shape of the annulus and the shape of the annular shoulder have been altered. Components in this and subsequent embodiments that are similar or identical to components in the first embodiment bear like numerals with the addition of an alphabetic designator to identify the specific embodiment to which it applies. In this embodiment, the valve body 12A is identical to the valve body 12 in the first embodiment. The valve needle 14A has an annulus 50 with more of a tear drop shape so that more of the cavity is adjacent the shank 28A. The angle of the chamfer 34A relative to the longitudinal axis 36 is the same as the angle in the first embodiment. The annular shoulder 44A differs in that it has an internal relief chamfer 52 at the central bore 38A and an external bevel 54 opposite the chamfer 52. Preferably, the angle of the external bevel 54 relative to the longitudinal axis 36A differs from the angle of the chamfer 34A by no more than about 15°. When the material of the annular shoulder 44A is fully swaged within the annulus 50, as shown in FIG. 6, there is a relief 56 between the annular flat 40A and the material of the annular shoulder 44A.

Figure 7:
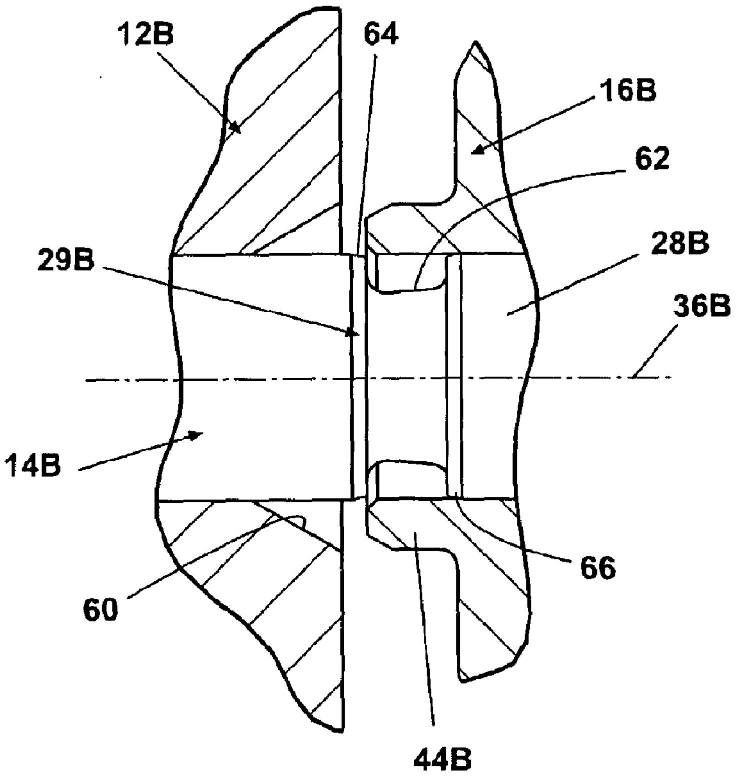
FIG. 7 is a partial cross sectional view similar to FIG. 5 of a third embodiment of an armature and control valve in a first stage of assembly.
Figure 8:
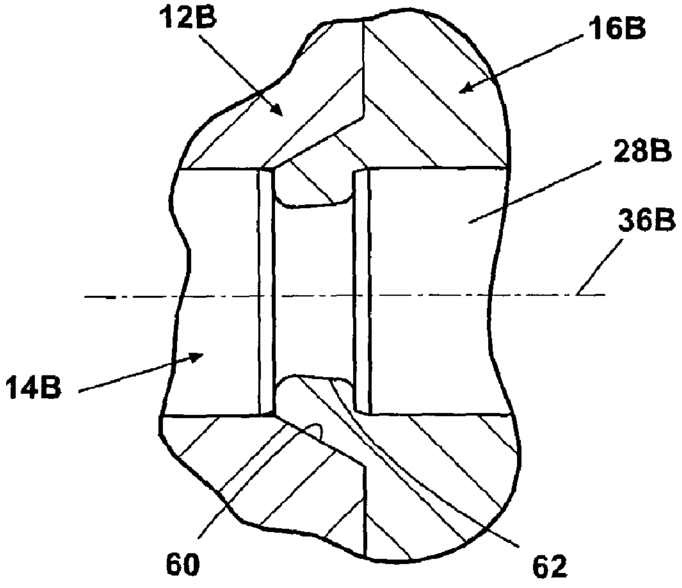
FIG. 8 is a partial cross sectional view of the third embodiment of FIG. 7 in a second stage of assembly.

FIGS. 7 and 8 illustrate a third embodiment where the shape of the annular shoulder 44B is the same as that in the second embodiment, but the shape of the annulus and the angle of the chamfer in the valve body have been altered. The body 12B has an annular chamfer 60 with a shallower angle relative to the longitudinal axis 36B in the range of 15-20°. A shallower angle reduces the pressure required on the planar surface 42. The annulus 62 in the valve needle 14B is more square-shaped than the first and second embodiments. A relief radius 64 is provided at the shoulder 29B and another relief radius 66 is provided at the junction of the annulus 62 and the stem 28B, which serves as a pivot point for the annular shoulder 44B during the swaging process. The completed swaged connection is shown in FIG. 8.

Figure 9:
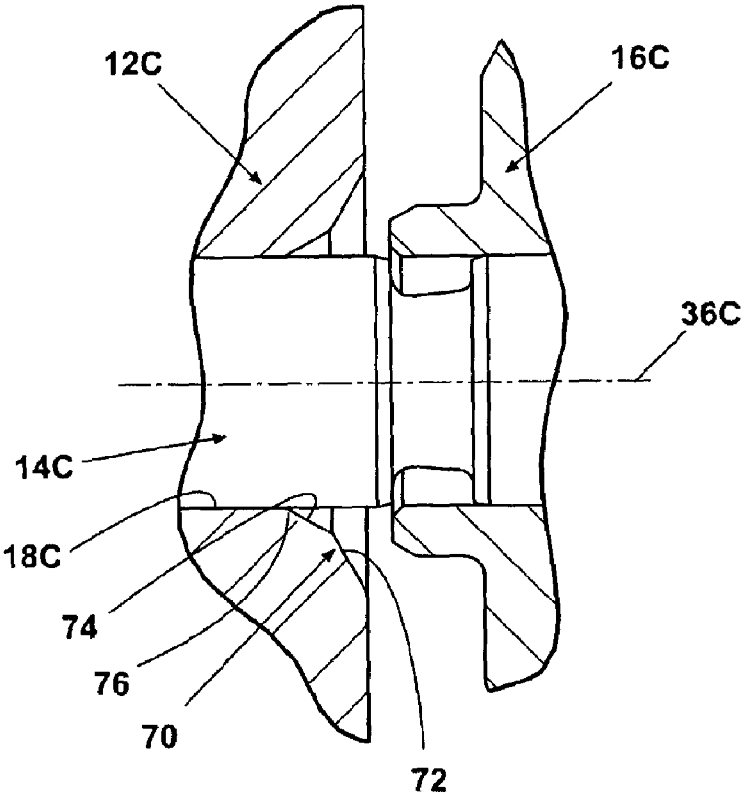
FIG. 9 is a partial cross sectional view similar to FIG. 5 of a fourth embodiment of an armature and control valve in a first stage of assembly.
Figure 10:
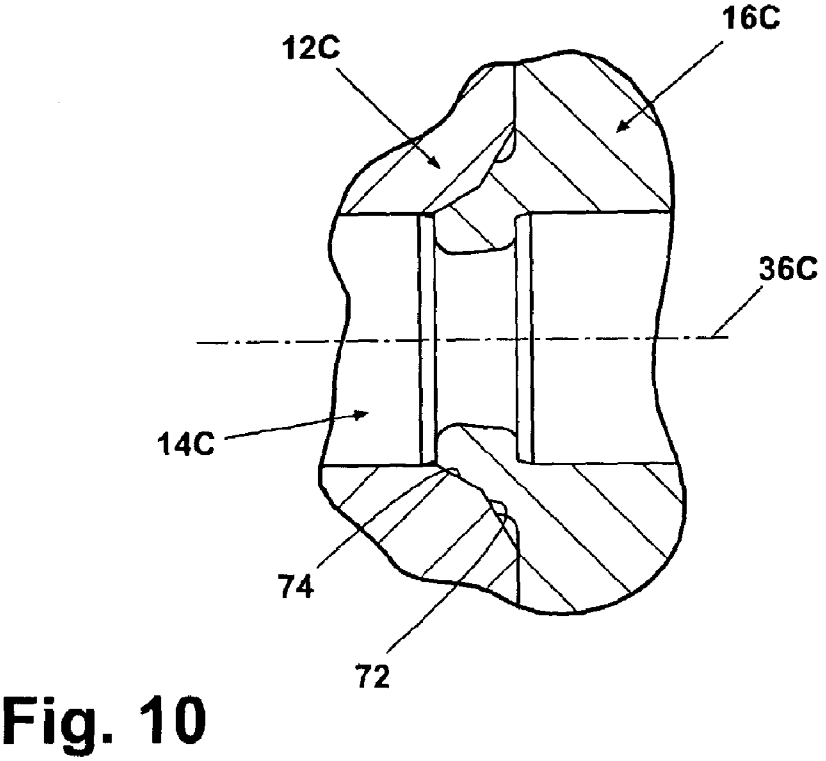
FIG. 10 is a partial cross sectional view of the fourth embodiment of FIG. 9 in a second stage of assembly.

FIGS. 9 and 10 illustrate a fourth embodiment where the shape of the annulus and the annular shoulder are identical to those in the third embodiment, but the shape of the chamfer and the valve body is altered. Here, the chamfer 70 of the valve body 12C comprises a shallower portion 72 adjacent the planar face 32C and a steeper portion 74 at the terminus 76 with the bore 18C. It is within the scope of the invention for the steeper portion 74 to be adjacent the planar face 32C and the shallower portion 72 at the terminus 76.

The construction according to the invention provides numerous benefits over the prior art. It allows finish assembly of the valve needle and the armature without post assembly grinding operations on the armature face. This is valuable because there are limited possibilities to grind the amateur face once it is assembled. Moreover, any damage that may be introduced between the valve needle 14 and the valve body bore 18 by grinding operations on the armature 16 can cause functional problems in the finished assembly. In addition, the perpendicularity of the armature 16 relative to the valve needle 14 is maintained after assembly.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of attaching an armature (16) to a valve needle (14) in a control valve (10) of the type that can be used in a fuel injector comprising:

providing a valve body (12) having a bore (18), a planar face (32), and an annular chamfer (34, 60, 70) in the planar face around the bore;

inserting into the bore (18) a valve needle (14) having a shank (28), a stem (26), and an annulus (30, 50, 62) between the shank and the stem;

placing over the stem an armature (16) having an annular flat (40) facing the planar face (32) and an annular shoulder (44) extending from the annular flat; and pressing the armature (16) toward the valve body (12) while the annular shoulder (44) bears against the chamfer (34) and deforms into the annulus (30) until the annular flat is stopped by the planar face (32).

2. The method of claim 1 wherein the valve body (12) and valve needle (14) are formed of hardened steel and the armature (16) is formed of softer metal.

3. The method of claim 2 wherein the softer metal is a magnetic iron cobalt alloy.

4. The method of claim 1 wherein the annulus (62) is square shaped.

5. The method of claim 1 wherein the armature (16) is disk shaped, having a planar surface (42) opposite the annular flat (40).

6. The method of claim 1 wherein the armature (16) has a central bore (38) that receives the stem (26) in slip fit.

7. The method of claim 1 wherein the angle of the annular chamfer (34) relative to the longitudinal axis (36) of the bore (18) is approximately 45 degrees.

8. The method of claim 1 wherein the angle of the annular chamfer (34, 60, 70) relative to the longitudinal axis (36) of the bore (18) is in a range of 15-60 degrees.

9. The method of claim 1 wherein the difference between the angle of the annular shoulder (44) relative to the longitudinal axis (36) at the point where it contacts the annular chamfer (34, 60, 70) and the angle of the annular chamfer (34, 60, 70) relative to the longitudinal axis (36) is in a range of 15-20 degrees.

10. The method of claim 1 wherein the annular shoulder (44) has a relief chamfer (52).

11. The method of claim 1 wherein the annular chamfer (70) has a shallower portion (72) and a steeper portion (74).

12. A control valve (10) made according to any of claims 1-11.

* * * * *

UNITED STATES PATENT AND TRADEMARK OFFICE

CERTIFICATE OF CORRECTION

PATENT NO. : 7,819,379 B2
APPLICATION NO. : 11/813822
DATED : October 26, 2010
INVENTOR(S) : Daren Bolbolan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this
Thirty-first Day of May, 2011

David J. Kappos

David J. Kappos
*Director of the United States Patent and Trademark Office*